US008706886B2

(12) United States Patent
Aiello et al.

(10) Patent No.: US 8,706,886 B2
(45) Date of Patent: Apr. 22, 2014

(54) METHOD AND SYSTEM OF DIGITAL CONTENT SHARING AMONG USERS OVER COMMUNICATIONS NETWORKS, RELATED TELECOMMUNICATIONS NETWORK ARCHITECTURE AND COMPUTER PROGRAM PRODUCT THEREFOR (75) Inventors: Alessandro Michele Aiello, Turin (IT); Giuseppe Valetto, Turin (IT)

(73) Assignee: Telecom Italia S.p.A., Milan (IT)

( * ) Notice: Subject to any disclaimer, the term of this patent is extended or adjusted under 35 U.S.C. 154(b) by 1054 days.

(21) Appl. No.: 11/597,869

(22) PCT Filed: May 31, 2004

(86) PCT No.: PCT/EP2004/005869
§ 371 (c)(1),
(2), (4) Date: Nov. 29, 2006

(87) PCT Pub. No.: WO2005/117386
PCT Pub. Date: Dec. 8, 2005

(65) Prior Publication Data
US 2007/0243860 A1 Oct. 18, 2007

(51) Int. Cl.
*G06F 15/16* (2006.01)
(52) U.S. Cl.
USPC ........ 709/227; 455/414.3; 709/229; 709/225; 725/74; 725/142; 725/32
(58) Field of Classification Search
USPC ........... 455/435.1, 414.3; 707/3, 10; 709/229, 709/227, 225, 204; 725/74, 142, 32
See application file for complete search history.

(56) References Cited

U.S. PATENT DOCUMENTS 7,584,225 B2 * 9/2009 Jiang et al. ............................. 1/1
2002/0087546 A1 * 7/2002 Slater et al. ..................... 707/10

(Continued)

FOREIGN PATENT DOCUMENTS

WO    WO 01/50755 A1    7/2001
WO    WO 02/089488 A1    11/2002

(Continued)

OTHER PUBLICATIONS

Stefan Saroiu et al, "An Analysis of Internet Content Delivery Systems", Proceeding of the Fifth Symposium on Operating Systems Design and Implementation, Boston, Massachusetts (USA), (1-12 pages), (Dec. 9-11, 2002).

(Continued)

*Primary Examiner* — Kamran Afshar
*Assistant Examiner* — Sayed T Zewari
(74) *Attorney, Agent, or Firm* — Finnegan, Henderson, Farabow, Garrett & Dunner, L.L.P.

(57) ABSTRACT

A method and a system for digital content sharing between individual users in a peer-to-peer fashion, wherein each user is connected to a respective local access network through a transport network. The method and system provide local network storage areas associated with each user arranged for archiving digital contents, and carry out the transferring of contents via the transport network from a storage area associated with a user holding requested contents to a remote network storage area associated with a requesting user on a different access network according to the connectivity available on the transport network. The shared contents are made available for access by the requesting user on its local network storage area. A telecommunications network architecture includes the system so that there is a plurality of services of content sharing between pairs of individual users implementing the above method.

35 Claims, 3 Drawing Sheets (56) References Cited

U.S. PATENT DOCUMENTS

| | | | |
|---|---|---|---|
| 2002/0107935 A1 | 8/2002 | Lowery et al. | |
| 2003/0037157 A1* | 2/2003 | Pestoni et al. | 709/231 |
| 2003/0158958 A1* | 8/2003 | Chiu | 709/231 |
| 2003/0191753 A1* | 10/2003 | Hoch | 707/3 |
| 2004/0205028 A1* | 10/2004 | Verosub et al. | 705/59 |
| 2004/0220791 A1* | 11/2004 | Lamkin et al. | 703/11 |
| 2005/0108430 A1* | 5/2005 | Howarth et al. | 709/245 |

FOREIGN PATENT DOCUMENTS

| | | |
|---|---|---|
| WO | WO 03/042795 A2 | 5/2003 |
| WO | WO 03/071800 A1 | 8/2003 |

OTHER PUBLICATIONS

Stephanos Androutsellis-Theotokis et al., "A Survey of Peer-to-Peer File Sharing Technologies", ELTURN, Athens University of Economics and Business, Greece. pp. 1-31, (2002).

Leander Kahney, "Coder finds new Way to Swap Tunes", pp. 1-6, Jan. 31, 2003, URL:http://www.wired.com/news/technology/1,57482-1.html.

H. Schulzrinne et al., "Real Time Streaming Protocol (RTSP)", Request for Comments: 2326, Standard Track, The Internet Society, pp. 1-92, Apr. 1998.

David C. Stewart, "Middleware Services Required for Peer-to-Peer Computing: A Guide for Developers", An Intel Corporation White Paper, Version 1.0, pp. 1-11, Feb. 2001.

* cited by examiner

METHOD AND SYSTEM OF DIGITAL CONTENT SHARING AMONG USERS OVER COMMUNICATIONS NETWORKS, RELATED TELECOMMUNICATIONS NETWORK ARCHITECTURE AND COMPUTER PROGRAM PRODUCT THEREFOR

FIELD OF THE INVENTION

The present invention concerns the sharing of contents among individual users over telecommunications networks, and more specifically the optimization of delivery and sharing of digital contents among individual users over and across heterogeneous wide and local area networks (e.g. Internet, Intranets, ...).

BACKGROUND OF THE INVENTION

Optimized delivery of contents among pairs of users is one of the key issues of today's Internet and has strongly emerged as a significant business opportunity. Also, corporations are looking at the advantages of optimized delivery of contents among pairs of users as a way for employees to share files without the expense involved in maintaining a centralized server and as a way to exchange information with each other directly.

The major systems available in current practice have been analysed in terms of importance, behaviours and implications in the paper "An Analysis of Internet Content Delivery Systems", by Stefan Saroiu, Krishna P. Gummadi, Richard J. Dunn, Steven D. Gribble, Henry M. Levy in Proceedings of the Fifth Symposium on Operating Systems Design and Implementation (OSDI 2002), Boston, Mass. (USA), Dec. 9-11, 2002.

The document points out that, besides classical World Wide Web, which has not been built for distribution of large multimedia files or documents and thus is not optimized therefor, one of most successful solutions is currently represented by file sharing applications based on peer-to-peer (p2p) approaches (such as Napster, Kazaa, Morpheus, etc.) that have been widely deployed and studied with respect to multiple aspects, including search capabilities, Digital Rights Management (DRM), privacy and others.

File sharing applications based on peer-to-peer approach allow users to devote a certain portion of their hard disk for the sharing of digital contents. Those applications include mechanisms to query the contents exposed by the totality or a subset of users and to require a transfer for contents of interest.

The white Paper "A Survey of Peer-to-Peer File Sharing Technologies", by Stephanos Androutsellis-Theotokis, ELTRUN, Athens University of Economics and Business, Greece, 2002, outlines the elements and typical behaviours of such kind of applications, defining peer-to-peer approaches in terms of networks architectures (centralized, fully decentralized, hybrid and/or unstructured, loosely structured, structured networks). It also points out that such architectures are based on "overlay networks" which may be totally unrelated to the physical network that connects the different nodes.

The applicant notes that such a lack of interaction between the peer-to-peer architectures and the underlying communications networks precludes improvements and optimization in performance and management of data transfers through the physical network, preventing Network Providers from offering better performances, even if their own physical network supports a variety of infrastructure-based improvements.

Such a lack of real interaction with the underlying communications networks is the cause of a number of drawbacks such as:

it generates a very heavy load on the networks, due to multiple transfers of possibly huge multimedia files, which cannot be scheduled or managed in any way by a network operator because of the anarchist approach of p2p; and it prevents users to achieve a good level of Quality of Service for their individual transfers, since it regards the underlying network as a simple transport pipe, which uses a best-effort approach and cannot employ any kind of advanced control facility.

It should also be noticed that the transfer modalities of current peer-to-peer systems and services imply the duplication of the required digital contents from its original location onto the disk of the user requiring the transfer. Said content duplication effectively enables the receiving user to acquire permanently the exchanged content: that is at times undesirable, for example because of the existing legal regulations regarding intellectual property rights over digital contents.

It should further be noticed that in the known art users need to be connected with their computers to the network in order to engage in content sharing activities and for the whole duration of any content exchange.

Therefore, the current state of the art in content sharing among individual users in a p2p fashion suffers from at least two major drawbacks, which may be summarized as follows:

considerable network load and suboptimal transfer performance;

content duplication.

Some optimizations have been proposed in the literature. A possible alternative to content duplication, as outlined for example in the news at www.wired.com: "Coder Finds New Way to Swap Tunes", by Leander Kahney, Jan. 31, 2003 (as retrieved on Mar. 12, 2004 at the complete URL http://www.wired.com//news/print/0,1294,57482,00.html), can be the temporary lending and borrowing of content: in "digital" terms such issue can be achieved through the use of data streaming techniques that, however, in peer-to-peer environments has been so far largely impeded once more by the lack of sufficient network performance.

With respect to the issue of network load due to multiple transfers, patent application WO 02/089488 teaches to organize a shared repository working as a cache for transferred contents, which is located upon and works on behalf of end users connected to a given access network. However, that approach only helps when the physical end points of the peer-to-peer transfer are located within the same access or local network.

WO 03/071800 discloses an evolution of the previous method in which local caches located on the various access network hubs can receive and also redistribute content originating from users operating from remote hubs. However, such approach doesn't address the optimization of content delivery during the transfer over the transport public network between said remote access hubs, which still suffer from sub-optimal network performance.

In a different but related field, Content Delivery Networks (CDNs) are another means for the delivery of contents, which can be made efficient and optimized, in particular when used in conjunction with other mechanisms, such as QoS control and/or Traffic Engineering (e.g., Multi-Protocol Label Switching—MPLS techniques).

However, as explained for example in the above-mentioned paper "An Analysys of Internet Content Delivery Systems", by Saroiu et al., the typical model is composed of a hierarchy of Content Providers such as web sites or streaming video sources, which partner with commercial CDN Providers to host and distribute contents to a plurality of end users or the general public.

CDNs and other mechanisms that follow hierarchical schemes are applied to one-to-many content distribution scenarios and do not address content sharing scenarios among pairs of individual users, in the fashion of peer-to-peer approach.

SUMMARY OF THE INVENTION

Object of the present invention is to provide a method and system for optimizing content sharing between pairs of individual users, which can be applied over heterogeneous network environments, including wide geographical networks, e.g. the transport public network.

Specifically, the invention provides a solution to improve the performance and management of data transfer, particularly when transferring multimedia files between individual users, thus optimizing flexibility and usability of services between physical end points (nodes) associated to remote hubs possibly located within different networks.

A further object of the invention is also to provide a solution to the issue of content duplication, avoiding the duplication of the requested digital contents from its original location onto the disk of the user requesting the transfer (requesting user), so as to prevent the requesting user to acquire permanently the exchanged content.

According to the present invention, these objectives are achieved by means of a method and system for content sharing between pairs of remote individual users, having the characteristics referred to in the independent claims.

Further object of the invention are a telecommunications network architecture, so as a plurality of services as claimed.

In summary, in order to solve the limitations of the state of the art in content sharing, the invention provides for the archiving of digital contents belonging to each user in a virtual remote storage area associated to that user, which corresponds to a portion of a physical network storage area located in a server belonging to the user's access network, which is preferably controlled by a network operator and is shared with other users of the same access network hub.

The system also includes a control element (also known as broker) that is in charge of providing access to content on behalf of the users, and managing, scheduling and optimizing transfers, between the afore-mentioned storage areas.

The method to carry out the transfer of contents between users basically consists of the following three steps:
- transfer of contents intended to be shared from the user to its own virtual remote area on the access network, in order to make the contents accessible through the wide area network architecture;
- upon request by a remote user, transfer of the contents from such remote area to the virtual remote area of the requesting user across the transport network; and
- access of the requesting user to the contents in its own virtual area on its access network.

This method is managed in a mixed way by users and network operator. In particular, in order to optimize end-to-end delivery and network load due to transfers, the network operator exert scheduling and control of network resources involved in the transfer over the transport network.

The invention brings about a number of advantages:
- it enables the network operator to control the traffic between the servers where the storage areas are located, making an efficient use of existing resources;
- it allows to keep under control and optimize some parameters such as the throughput of the network link between the network storage areas, through appropriate transmission, scheduling and engineering mechanisms applied upon such network links; consequently, it enables users to access remote contents at an optimized transfer rate;
- it keeps shared contents available on line on the assigned personal storage areas of the users;
- by virtualizing content storage areas, it enables users to take part in content sharing activities and services even when they are not directly connected with their own computer on the access network;
- further, it prevents duplication of contents onto the hard disks of users' computers.

BRIEF DESCRIPTION OF THE DRAWINGS

Further characteristics and advantages of the invention will be explained in more detail in the following description, provided by way of non-limiting example with reference to the appended drawings, in which.

DETAILED DESCRIPTION OF A PREFERRED EMBODIMENT

Figure 1:
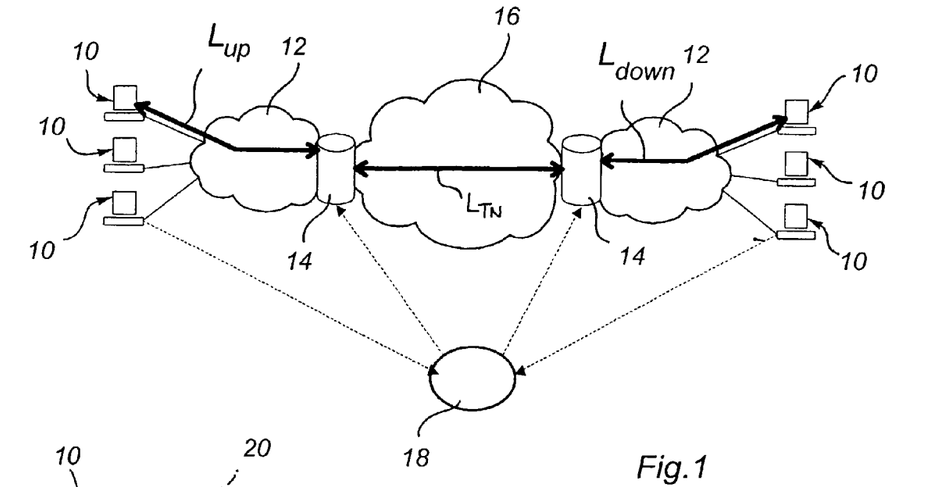
FIG. 1 is a schematic logical diagram of the overall system according to the invention.

The system according to the present invention for achieving contents sharing between pairs of remote individual users connected to heterogeneous network environments, is depicted in FIG. 1.

Client machines 10 belonging to the users of the system are located at the end point of the overall network architecture, and are directly connected to respective local Access Networks 12, each one including at least one respective Network Storage Server (NSS) 14. Access Networks 12 are connected for inter-communication to one wide area Transport Network 16 (as reported in FIG. 1) or a plurality thereof. A broker module 18 manages the transfer of contents over the Transport Network 16.

Figure 2:
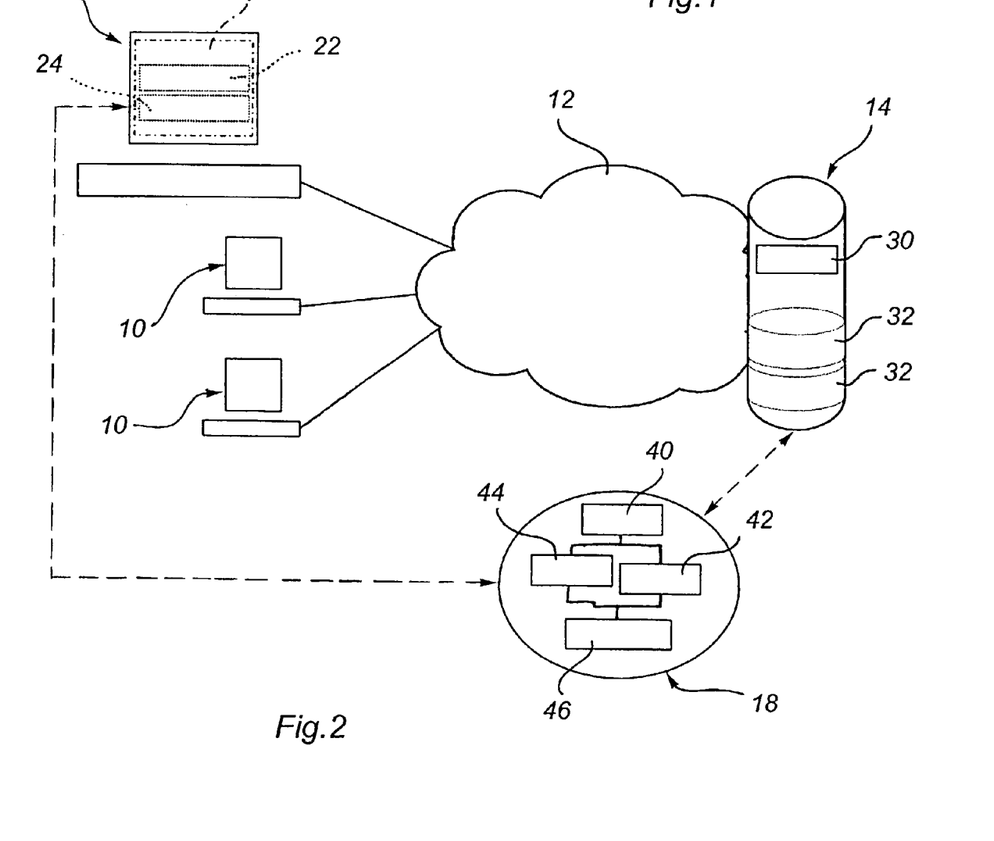
FIG. 2 is a schematic logical diagram of a portion of the system of FIG. 1.

With reference to FIG. 2, the elements of the system are disclosed in more detail.

The client machine 10 is a device comprising a common hardware, running a generic operating system and able to handle multimedia contents. It is supposed that the client machine 10 is able to communicate with other elements of the architecture (e.g. the Network Storage Server 14 or the Broker 18) in a predetermined way, by means of a resident client software program module 20.

The client software program module 20 is equipped with a Data Interface 22, which provides all interactions with the NSS 14 for the upload/download of contents through predetermined protocols (e.g. file transfer protocol (ftp), real time protocol (rtp), hyper text transfer protocol (http), and other well known ones); the client software program module 20 is also equipped with a Control Interface 24, which takes care of the interactions with the Broker for the exchanging of messages, queries/responses, signalling and so on.

The Network Storage Server (NSS) 14 is associated to each Access Network 12 and comprises a physical device dedicated to store the users' files. The NSS 14 is structured and partitioned by means of a control software module 30 into multiple repositories referred to as Virtual Personal Storage Areas (VPSA) 32.

Each VPSA 32 is assigned, in a preferred embodiment, to a single user and is partly under the control of that user and partly under the control of a Service Provider which offers the service associated to this system. The VPSA 32 is also supposed to be able to communicate with other elements of the network architecture (such as the broker module, other VPSAs, the user client machine, etc.) by means of the control software module 30, in a predetermined way.

The Broker module 18 is a software entity operated, for example, by the transport network operator, arranged to manage and serve the requests of users by organizing and optimizing the transfers of contents over the Transport Network 16. The Broker module 18 comprises a Search and Location sub-module 40 for the features of content indexing, search and location typical of peer-to-peer environments (in this respect, see "Middleware Services Required for Peer-to-Peer Computing—A Guide for Developers"—An Intel Corporation White Paper, Version 1.0, February 2001 for an overview of widely studied and adopted mechanisms of indexing, search and location). Moreover, the Broker module 18 comprises a Network Control sub-module 42 for the optimization of network traffic and transfer management with typical, well-known techniques used by Internet Service Providers for optimizing (e.g. implementing CDN distribution mechanisms, and so on).

The Network Control sub-module 42 is able to manage, in the preferred embodiment, techniques for traffic and transfer management, based, for example, on parameters, such as user priority, file dimensions, transfer completion time, available bandwidth.

The Broker 18 is also equipped with a Control Interface 44, which takes care of the interactions with the client machines 10 for the exchanging of messages, for example, queries/responses, signalling and so on.

Additionally, the Broker 18 also comprises a Policy Management sub-module 46, in charge to implement any necessary policies related to the service offered (e.g. access rights, VPSA space management, etc.). The functionality, capabilities and interactions with the overall system of the Policy Management sub-module 46 will be further specified in the following.

The applicant notes that the Broker module 18 could be (totally or in part) implemented in a centralized or distributed way on network hosts or on specialized devices associated to the network.

The applicant further notes that the features of the Broker 18 could be (totally or in part) implemented in an automatic or manual way (that is, by using administrators or human interaction for performing—totally or in some part—those tasks).

The Access Network 12 connects users (e.g. residential ones) to the Transport Network 16 and can operate according to different technologies, such as PSTN physical lines (e.g. xDSL), LANs (e.g. Ethernet), or even mobile data networks (e.g. UMTS). Each Access Network 12 has one or more NSS units located as close as possible to the users in order to optimize the performance of content upload/download.

The Transport Network 16 is the geographical network that connects different Access Networks and can be made of public (e.g. Internet) or private parts, spanning one or multiple domains and based on different technologies, such as Asynchronous Transfer Mode (ATM), Frame Relay (FR), Synchronous Digital Hierarchy (SDH).

It is to be noted that, in the preferred embodiment, the overall system preferably works on the usual TCP/IP protocols. An expert of the field can observe how the approach can also work on alternative protocols.

The objects of the invention are achieved by introducing the archiving of digital contents belonging to one user in a repository or virtual personal storage area (VPSA) 32, located on the local Access Network 12 and remotely with respect to users' client machines 10.

Multiple VPSAs 32 of users on the same Access Network 12 can be placed on the same NSS, which is under the control of the user with respect to the storage of contents (that is, the user decides what contents are to be stored within its VPSA 32, as long as it does not exceed, e.g., a pre-determined quota), and under the control of a network operator with respect to other aspects, such as the management of transfers over the Transport Network between VPSAs 32 on different Access Networks 12.

The overall architecture, whose topology and elements are outlined in FIG. 1, allows the sharing of content between individual users 10a-10d (FIG. 3) as follows.

Initially, the upload of contents by a first user (providing user) 10a (FIG. 1 and FIG. 3) on its VPSA 32a is carried out according to the connectivity available on the access network 12 for that user along a link $L_{up}$. Depending on service policies decided by the Service Provider, the contents may remain on the VPSA 32a even if the user is disconnected from the network, temporarily or permanently.

Figure 3:
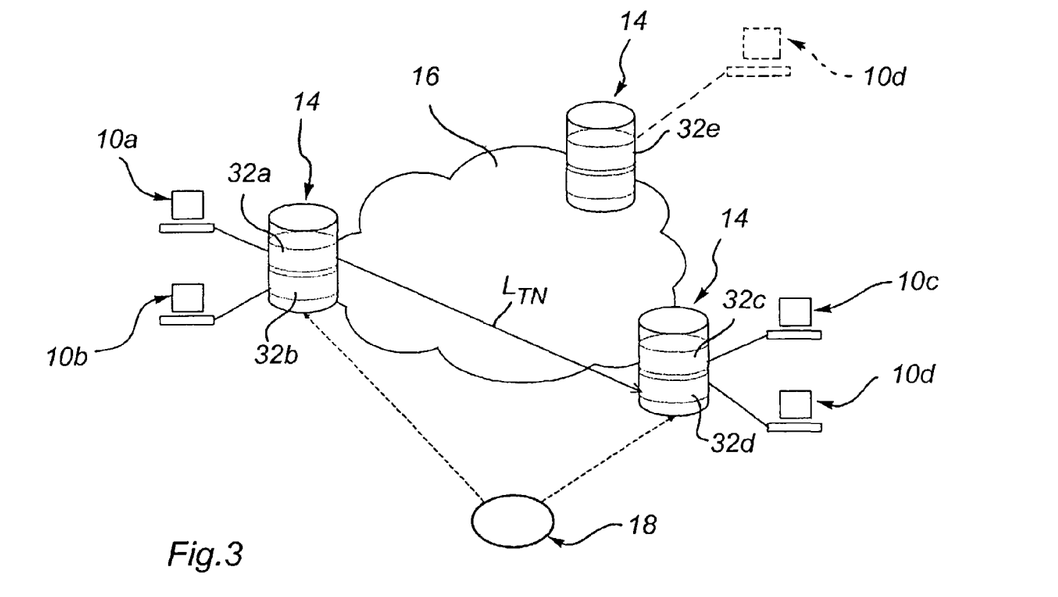
FIG. 3 is a schematic diagram of the system of FIG. 1 regarding operation mechanisms and traffic control over the transport network.

Such first step of transfer is done inside the access network 12, involving only the physical line of the user to the (public) network access devices, and can be performed at the maximum rate allowed by the type of technology (e.g. xDSL lines, simple dial-up, radio links or other technologies) available for the access network link, independently of possible bottlenecks (and therefore performance decrease) existing over the public transport network.

When another user 10d requires some contents, those contents are found through the Broker 18, which is in charge to accommodate such request by means of its Search and Location sub-module 40, the contents on VPSAs having been previously indexed. Content requests are managed by the Broker 18, which is in charge of performing, e.g., in an optimized way, the transfer from the origin NSS 14 to another NSS 14' hosting the VPSA 32d of the receiving user 10d via a link $L_{TN}$ over the public transport network.

The Broker 18 chooses when and how to perform the transfer of contents, for example according to the status of the load, available resources and mechanisms available in the public network, applying e.g. typical QoS, Traffic Engineering, CDNs mechanisms or other well known techniques in the state of the art.

After the transfer is performed over the transport network, the contents are available on the VPSA 32d of the receiving user 10d and finally ready for fruition, according to the connectivity of the destination access network or download link $L_{DOWN}$ and through the most appropriate predetermined protocol, depending on the content kind, application and established service policies.

It should be noted that the requesting user 10d could also express its own requirements for the transfer (e.g. in terms of timelines of availability on the receiving side), and the Broker 18 could also consider user requirements besides those related to the network (e.g. when scheduling the time of the transfer).

Additionally, if a requesting user 10d asks the Broker 18 for some content which is not available or not found at the moment of the request, he can delegate later searches to the Broker 18, which will take care of transferring the content whenever it becomes available. This is possible even in case the requesting user 10d is not connected after the initial query.

The user's VPSA 32 preferably remains the destination of content transfers, independently of the actual location of the user. Users 10 can interact with the Broker 18 and ask for contents of interest that will be transferred on his own VPSA 32 even if he is not connected on his usual access network but, for example, he is temporarily served by another local access network (e.g. when staying in another place or office, outdoor, in a public place, ... ).

According to a further embodiment, the network operator may change the location of a user VPSA 32 to a different NSS 14 according to user's movements or requests, or may assign to a user a plurality of VPSAs distributed in different NSS 14 according to the needs of the user. Thanks to these characteristics, the requesting user 10d may ask the broker 18 to transfer the contents of interest (to be downloaded or already downloaded on his own VPSA) on a VPSA 32e in a different NSS 14" on a different access network to which he is temporarily connected, or to which he is going to be connected in predetermined delivery times.

The Broker 18 preferably optimizes some requests by avoiding redundant transfers in cases whereby the contents asked by a first user 10d have been just requested and obtained by another user 10c on the same access network, or otherwise closer, with respect to the originating one. This can be done by reusing well-known caching techniques of CDNs, or by using within the architecture, for example on the Broker 18, techniques for time and space monitoring of the location of previously transferred files.

Figure 4:
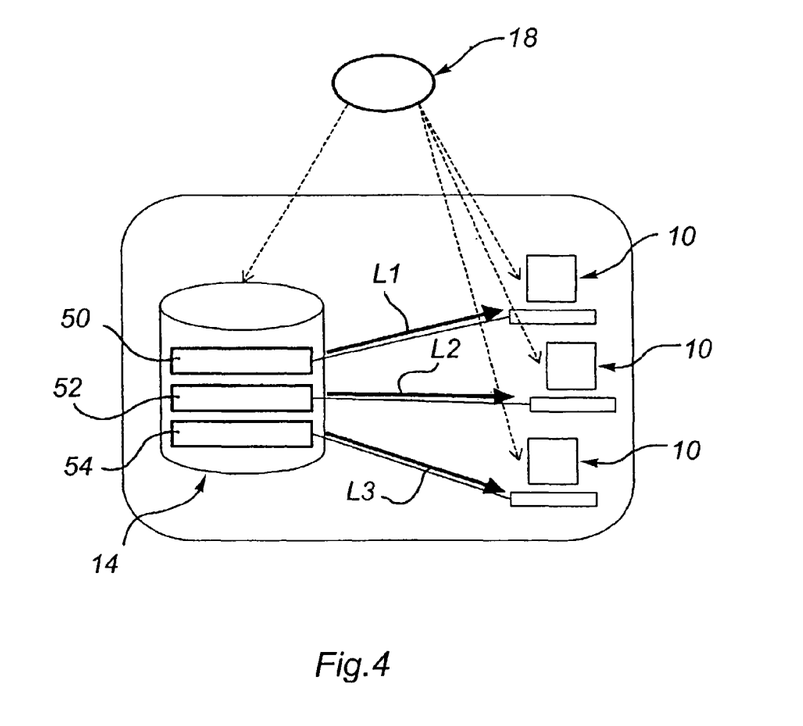
FIG. 4 shows possible ways for delivery of contents in the system according to the invention.

In a further embodiment (FIG. 4) it is shown how the invention enables different methods for content fruition, according to the different types of contents. A NSS 14 stores, for example, multimedia files 50, document files 52 and web contents 54. Those three different types of contents are available to users 10 belonging to the same access network under the control and supervision of broker 18 over network links L1, L2, L3, respectively. Multimedia files 50 are transferred to a first user over link L1 with Real-Time Streaming Protocol (RTSP), document files 52 are transferred to a second user over link L2 with File Transfer Protocol, and web contents 54 are transferred to a third user over link L3 with Hyper Text Transport Protocol (HTTP).

Advantageously, the system according to the invention enables a number of QoS-aware value-added services.

A preferred embodiment of the invention implements a mechanism for digital content sharing (for example of multimedia contents) between pairs of individual users via quality streaming.

According to the current state of the art, modalities for the transferring and sharing of contents between users in existing peer-to-peer systems and services require the duplication of the requested digital content from its original location onto the disk of the user requiring the transfer, and do not support streaming of the content between the users. In fact, according to the current state of the art, data streaming in a peer-to-peer architecture over a generic wide-area network (e.g. the Internet) is often an insurmountable challenge. Since, according to the known art, streaming requires real-time performance and a non-trivial amount of guaranteed bandwidth between its end points, whereas the connectivity between two given users of a peer-to-peer service is typically unknown and unpredictable, any content exchange is subject to variations and bottlenecks throughout the network path between the two ends represented by the users' own computers.

The system according to the invention effectively enables contents sharing services between pairs of individual remote users based on well-known streaming techniques, in which users employ their respective VPSA for storing and exchanging the multimedia digital contents.

One approach to enable such a service can be described as "download-and-stream". According to this approach, contents requested by user 10d (FIG. 1 and FIG. 3) and located via the broker 18 on the VPSA 32a of another user 10a are first downloaded to the VPSA 32d of the receiving user 10d, employing transfer optimization techniques on the link $L_{TN}$ connecting the network nodes where the two VPSAs 32a, 32d are located. Since that link is under the control of the operator and can be engineered and managed, the unpredictability of the network between users can be eliminated, and quality guarantees on the link can be provided.

Once the content is fully stored on the VPSA 32d of the receiving user 10d, reliable quality streaming to the computer of the receiving user can occur at the full bandwidth enjoyed by that user in the connection $L_{DOWN}$ with the NSS hosting his VPSA 32d.

By enabling a peer-to-peer streaming service, according to the method described above, a number of advantages with respect to the state of the art of such services can be achieved:

- since contents are at all times stored on VPSAs 32 residing on NSSs 14, which are under the control and management of the network operator, appropriate policies regulating the fruition of the shared contents can be easily enforced by the operator. For example, the contents may be made available only for a limited time or for a limited number of accesses, can be secured and encrypted, can be traced back to their originator, can be accounted for and billed;
- the service infrastructure can also guarantee that after the fruition of the streamed contents, no copies of those contents (either partial or complete) remain permanently stored anywhere in the service infrastructure;
- any combination of those techniques and systems can be put in place by the NSS control software module 30 and/or by the Broker 18 overseeing the contents transfer on the part of the service operator. In particular, an appropriate combination of those techniques can enable a novel paradigm for personal contents sharing between individual users, which departs from the need of content duplication and defines and supports a temporary lending/borrowing relationship between the two users.

Such a temporary lending/borrowing relationship can be defined by the following characteristics, or a subset thereof:
i) the transfer of the digital content between the VPSAs of the two users must be secure and controlled, under the management of a service provision infrastructure;
ii) a set of constraints can regulate the access of the shared contents on the part of the borrowing user. One of the constraints may be the limited duration of the access; other additional constraints, such as (but not limited to) a restricted number of accesses in parallel or over time, could also be defined and enforced;
iii) whenever the constraints regulating access to the contents are not valid anymore, it must be guaranteed that access to the content is revoked;
iv) data must not remain persistent in any storage space under the management of the service and must not be made available to the borrowing user beyond the established duration limits;

v) access to digital contents by the borrowing user must occur exclusively through secure and/or authenticated streaming mechanism.

Further advantages are given by the fact that the potential privacy and security hazards of exposing onto the network (or a portion thereof) one's own mass storage device are mitigated, since shared contents are placed onto the VPSA of the user, which is on a NSS remote with respect to his own machine (personal computer or workstation). Appropriate security measures for protecting and preserving contents on the NSS can be centrally implemented by the network operator for all the users of the service.

A further service, different from the download-and-stream approach described above, which retains the same advantages and can be equally supported by the system according to the invention, can be referred to as "two-step-streaming" service.

That approach employs the VPSA 32d on the receiving end as a streaming buffer for temporary storage of the contents, according to the data streaming techniques well known in the state of the art (such as, for example, RTSP, see "Real Time Streaming Protocol, RFC n. 2326").

The two-step streaming approach, according to the present invention, implements actual end-to-end contents streaming and applies in a novel contents sharing context, i.e., between remote individual users, well-known techniques used in hierarchical and client-server content distribution schemes (disclosed for example in WO 03/042795).

The two-step streaming approach, according to the present invention, requires the implementation of more sophisticated control policies on the part of the broker module 18 than the download-and-stream approach previously described, as detailed below.

The broker, first of all, comprises functionality to evaluate the connectivity rate available on the link $L_{DOWN}$ between the user on the receiving end and his VPSA 32d, with respect to the data rate necessary to carry out the streaming of the required contents.

Furthermore, the broker 18 comprises functionality to allocate on the link $L_{TN}$ connecting the VPSAs 32a, 32d sufficient bandwidth for streaming the contents between the VPSAs, and initiates such streaming.

While data accumulates in a two-ended buffer located on the VPSA 32d on the receiving side, the broker 18 initiates another streaming process from that buffer onto the client machine 10d, over the link $L_{DOWN}$.

The two different streaming processes may occur according to different protocols and techniques, but are kept well-coordinated at all times by the broker 18 and/or the control software module 30 on the NSS 14, which must ensure that the buffer on the VPSA 32d never suffers from data starvation.

The two-step streaming approach can also be made adaptive, by reverting to download-and-stream in case enough network resource cannot be ensured or are unlikely to be ensured for the streaming between the VPSAs on link $L_{TN}$.

Figure 5:
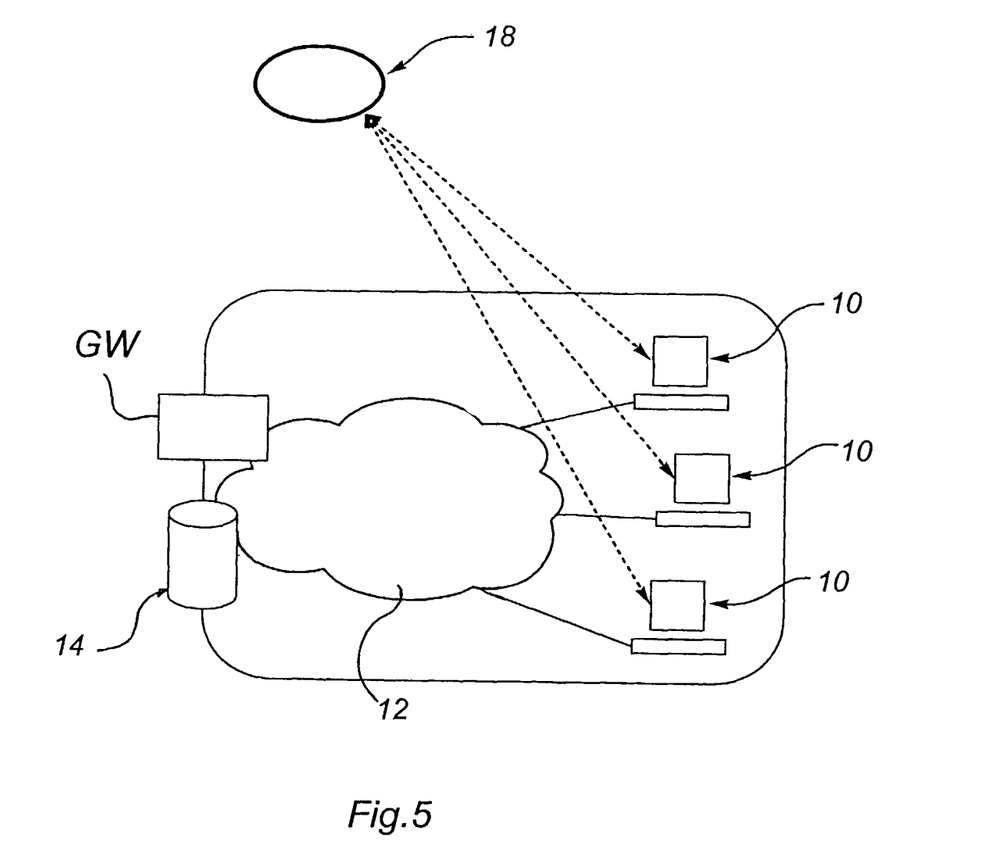
FIG. 5 is a schematic logical diagram of a portion of the system of FIG. 1, in a different condition of use.

With reference to FIG. 5, it should also be noted that the system according to the invention helps if the users are behind firewalls or gateways GW or any other kind of device which can give troubles in p2p environments, preventing users to achieve end to end transparency for the connections carrying out the transfer.

Thanks to the arrangement of NSS 14 and VPSA 32 (FIG. 1, FIG. 2, and FIG. 5) which may well be implemented on the same firewall or gateway GW, contents transfers are not impeded by the location of the user and any constraints that are placed upon his connectivity and access rights to the transport network, since the user doesn't require to directly communicate with other users to carry out such transfers. The user needs simply to be allowed to communicate with the Broker 18 and the NSS 14 via the control interface 24 of his client software module 20, for example via appropriate protocols that are allowed by protected networks (such as HTTP), to specify queries, transfer requirements and the such.

Naturally, the principle of the invention remaining the same, the forms of embodiment may be varied widely with respect to those described and illustrated purely by way of non-limiting example, without thereby departing from the scope of protection of the present invention defined by the appended claims.

The invention claimed is:

1. A method of digital content sharing between a providing user and a requesting user in a peer-to-peer fashion, wherein the providing user and the requesting user are respectively connected to providing access networks and to a requesting access network and wherein at least one transport network is interposed between said access networks, comprising:
   archiving digital contents by the providing user into a first virtual remote user storage area associated with the providing user, said first virtual remote user storage area including at least a portion of a shared storage area of a first network storage server, said first network storage server belonging to the providing access network and linked to the at least one transport network, wherein the first virtual remote user storage area is physically located on the first network storage server and remotely with respect to the providing user;
   transferring said digital contents via said at least one transport network from said first virtual remote user storage area associated with the providing access network to a second virtual remote user storage area associated with the requesting access network on the basis of at least one of a connectivity available on the transport network and a requirement associated with the requesting user, the transferring occurring under management of a control module of the transport network, wherein said management comprises providing access to content, managing, scheduling and optimizing transfers between said user storage areas, and policy management; and
   making available the digital contents for access by the requesting user on the second virtual remote user storage area, wherein the second virtual remote user storage area is associated with the requesting user, said second virtual remote user storage area including at least a portion of a shared storage area of a second network storage server, said second network storage server belonging to the requesting access network and linked with the at least one transport network, the making available occurring under management of the control module of the transport network, wherein said management comprises providing access to content, scheduling and optimizing transfers between said user storage areas, and policy management.

2. The method according to claim 1, wherein each of the first and second virtual remote user storage areas is on a respective storage server belonging to the access network to which the respective providing and requesting user is connected.

3. The method according to claim 1, wherein the archiving of digital contents by the user on the first virtual remote user storage area is carried out according to the connectivity available between the providing user and the access network to which the providing user is connected.

4. The method according to claim 1, wherein the archiving of contents by the providing user on the first virtual remote user storage area comprises indexing of the digital contents.

5. The method according to claim 4, further comprising searching contents by the requesting user by means of indexes associated with the digital contents as indexed.

6. The method according to claim 1, wherein the digital contents made available by the providing user remain on the first virtual remote user storage area even if the providing user is disconnected from the providing access network.

7. The method according to claim 1, wherein the requirements associated with the requesting user comprise scheduling instructions by the requesting user.

8. The method according to claim 1, wherein transferring contents via said at least one transport network occurs when the digital contents become available on the first virtual remote user storage area independently of the requesting user being connected to the requesting access network.

9. The method according to claim 1, further comprising:
transferring contents via said at least one transport network in predetermined delivery times to an access network temporarily associated with the requesting user and to which the requesting user is temporarily connected.

10. The method according to claim 1, comprising:
transferring contents via said at least one transport network, the transfer comprising:
monitoring the digital contents as transferred to the requesting access network; and
selectively transferring the digital contents in cases, wherein the monitored contents have been already transferred to at least one virtual remote user storage area of the requesting access network.

11. The method according to claim 1, wherein transferring contents via said at least one transport network is made according to streaming techniques.

12. The method according to claim 1, wherein archiving contents, transferring contents over the transport network, and making available contents are managed by a control module operated by an operator of the transport network.

13. The method according to claim 1, wherein the digital contents are made available to said second virtual remote user storage area for a limited time and/or for a limited number of accesses.

14. The method according to claim 1, wherein the digital contents are made available to said second virtual remote user storage area in a secured and/or encrypted form.

15. The method according to claim 1, wherein transferring contents via said at least one transport network comprises:
accounting and billing the transferred contents.

16. A system of digital content sharing between a providing user device and a requesting user device in a peer-to-peer fashion, wherein the providing device and the requesting device are respectively connected to providing access networks and to a requesting access network and wherein at least one transport network is interposed between said access networks, comprising:
a first virtual remote user storage area associated with the providing device, said first virtual remote user storage area including at least a portion of a shared storage area of a first network storage server, said first network storage server belonging to the providing access network and linked to the at least one transport network, wherein the first virtual remote user storage area is physically located on the first network storage server and remotely with respect to the providing device; and
a control unit of the transport network configured to:
provide access to the digital contents archived into the first virtual remote user storage area associated with the providing access networks; and
manage transfer of the digital contents via said at least one transport network to a second virtual remote user storage area, wherein the second virtual remote user storage area is associated with the requesting device, said second virtual remote user storage area including at least a portion of a shared storage area of a second network storage server, said second network storage server belonging to the requesting access network and linked with the at least one transport network, and wherein said managing transfer of the digital contents comprises providing access to content, scheduling and optimizing transfers between said user storage areas, and policy management.

17. The system according to claim 16, wherein the each of the first and second virtual remote user storage areas is on a respective storage server belonging to the access network to which the respective providing and requesting device is connected.

18. The system according to claim 17, wherein the storage server is partitioned into a plurality of virtual remote user storage areas.

19. The system according to claim 18, wherein each virtual remote user storage area of said plurality is assigned to a single user device and is partly under the control of the single device and partly under the control of the control unit.

20. The system according to claim 17, wherein each of the providing and requesting devices comprises a content processing module for managing communications both with the control unity and the respective storage server.

21. The system according to claim 20, wherein the content processing module comprises a control interface for providing interactions with the control unit.

22. The system according to claim 20, wherein the content processing module comprises a data interface for providing interactions with the respective storage server for managing contents upload/download through predetermined protocols.

23. The system according to claim 16, wherein the control unit comprises at least one of the following:
a control interface arranged for interacting with the providing and requesting devices;
a search and location sub-module arranged for indexing, searching, and locating contents archived in each of the first and second virtual remote user storage areas; and
a network control sub-module arranged for managing transfer of contents via the transport network.

24. The system according to claim 17, wherein said second virtual remote user storage area is implemented as a streaming buffer for temporary storage of the contents, according to data streaming techniques.

25. The system according to claim 17, wherein each of the storage servers are implemented on a respective firewall or gateway protecting the access network to which the respective providing and requesting device is connected.

26. The system according to claim 16, for carrying out a method comprising:
archiving digital contents by the providing user in the first virtual remote user storage area;
transferring contents via said at least one transport network from said first virtual remote user storage area to the second virtual remote user storage area on the basis of at least one of a connectivity available on the transport network and a requirement associated with the requesting user; and making available the digital contents for access by the requesting user on the second virtual remote user storage area.

27. A telecommunications network architecture comprising a system for digital content sharing between a providing user device and a requesting user device in a peer-to-peer fashion, wherein the providing device and the requesting device are respectively connected to providing access networks and to a requesting access network and wherein at least one transport network is interposed between said access networks, comprising:
a first virtual remote user storage area associated with the providing access network arranged for archiving digital contents, wherein the first virtual remote user storage area is physically located on a first network storage server and remotely with respect to the providing access network; and
a control unit of the transport network configured to:
provide access to the digital contents archived into the first virtual remote user storage area associated with the providing device, said first virtual remote user storage area including at least a portion of a shared storage area of the first network storage server, said first network storage server belonging to the providing access network and linked to the at least one transport network; and
manage transfer of the digital contents via said at least one transport network to a second virtual remote user storage area, wherein the second virtual remote user storage area is associated with the requesting device, said second virtual remote user storage area including at least a portion of a shared storage area of a second network storage server, said second network storage server belonging to the requesting access network and linked with the at least one transport network, and wherein said managing transfer comprises providing access to content, scheduling and optimizing transfers between said user storage areas, and policy management.

28. The method of claim 1, wherein the digital content sharing involves a service of lending/borrowing between the providing user and the requesting user in a peer-to-peer fashion.

29. The method of claim 1, wherein the digital content sharing involves a service of content sharing between the providing user and the requesting user in a peer-to-peer fashion, according to a download-and-stream technique.

30. The method of claim 1, wherein the digital content sharing involves a service of content sharing between the providing user and the requesting user in a peer-to-peer fashion, according to a two-step-streaming technique.

31. A non-transitory computer-readable medium containing instructions that, when executed by a computer, perform a method of digital content sharing between a providing user and a requesting user in a peer-to-peer fashion, wherein the providing user and the requesting user are respectively connected to providing access networks and to a requesting access network and wherein at least one transport network is interposed between said access networks, comprising:
archiving digital contents by the providing user into a first virtual remote user storage area associated with the providing user, said first virtual remote user storage area including at least a portion of a shared storage area of a first network storage server, said first network storage server belonging to the providing access network and linked to the at least one transport network, wherein the first virtual remote user storage area is physically located on the first network storage server and remotely with respect to the providing user;
transferring contents via said at least one transport network from said first virtual remote user storage area associated with the providing access network to a second virtual remote user storage area associated with the requesting access network on the basis of at least one of a connectivity available on the transport network and a requirement associated with the requesting user, the transferring occurring under management of a control module of the transport network, wherein said managing transfer comprises providing access to content, scheduling and optimizing transfers between said user storage areas, and policy management; and
making available the digital contents for access by the requesting user on the second virtual remote user storage area, wherein the second virtual remote user storage area is associated with the requesting user, said second virtual remote user storage area including at least a portion of a shared storage area of a second network storage server, said second network storage server belonging to the requesting access network and linked with the at least one transport network, the making available occurring under management of the control module of the transport network, wherein said management comprises providing access to content, scheduling and optimizing transfers between said user storage areas, and policy management.

32. The method according to claim 1, wherein the control module is further configured to be managed in a mixed way by a transport network operator and at least one of said providing user and said requesting user, and wherein the transfer of said digital content is controllable by the transport network operator.

33. The system according to claim 16, wherein the control unit is further configured to be managed in a mixed way by a transport network operator and at least one of said providing user and said requesting user, and wherein the transfer of said digital content is controllable by the transport network operator.

34. The system according to claim 16, wherein the control unit is further configured to be controlled automatically.

35. The non-transitory computer-readable medium according to claim 31, wherein the control module is further configured to be managed in a mixed way by a transport network operator and at least one of said providing user and said requesting user, and wherein the transfer of digital content is controllable by the transport network operator.

* * * * *